3,000,718
PROPELLANT COMPOSITIONS
William E. Campbell, Jr., Pasadena, Lloyd H. Brown, Altadena, and Adolph L. Antonio, Pasadena, Calif., assignors to Aerojet-General Corporation, Cincinnati, Ohio, a corporation of Ohio
No Drawing. Filed Dec. 20, 1948, Ser. No. 66,392
12 Claims. (Cl. 52—5)

This invention relates to jet propulsion and particularly to an improved propellant charge of the solid type useful in rockets and rocket motors.

An object of the invention is to provide a propellant charge which is substantially smokeless and not toxic in its burning or decomposition, and is capable of good performance during and after exposure to wide variations in temperature.

Another object is to provide a propellant charge that can be cast, mixed and polymerized at ambient temperature thereby eliminating the hazard of curing at elevated temperatures.

A rocket or rocket motor commonly comprises a combustion chamber with an exhaust nozzle leading from the chamber; and it is a common practice to power them by combusting solid propellant charges within the motor chamber. This produces a large volume of gas at elevated pressure, and the force of the reaction of this mass of gas escaping at high velocity through the exhaust nozzle develops the thrust.

A form of solid propellant charge which has heretofore been commonly used in the chamber comprises a thermoplastic fuel such as asphalt into which there has been incorporated a finely-divided oxidizer in quantities sufficient to permit the desired degree of oxidation of the fuel constituents of the propellant mass.

Another type of solid propellant composition is that described in application Serial No. 647,189, now abandoned, of Roy F. Roberts and assigned to the same assignee as this invention. That application discloses a solid propellant charge comprising an intimate mixture of thermosetting alkyd resin with a finely-divided inorganic oxidizer dispersed therein.

The asphalt oxidizer type of propellant mentioned above is generally of the smoky type, that is, upon burning it gives off substantial quantities of smoke and toxic gases, particularly when the oxidizer is a metallic inorganic oxidizer such as metallic or inorganic perchlorates, nitrates, etc. The production of toxic gases and smoke is undesirable for many purposes, especially where the operation of the motor occurs in confined area or where it is desired to conceal the operation of the rocket motor entirely. The thermosetting alkyd resin-oxidizer type of propellant mentioned above can be compounded to produce less smoke than the asphalt oxidizer type because of the fact it is possible to incorporate therein either the organic oxidizers or non-metallic inorganic nitrates, or both. Another factor that is involved in making the alkyd resin type of propellant is that normally it is cured at elevated temperatures to insure a sufficiently rapid polymerization. Although it is sometimes possible under certain conditions to polymerize alkyd resins at low temperatures, such low temperature polymerization is not ordinarily practical under the conditions accompanying the making of these propellants. Curing at elevated temperatures introduces somewhat of a hazard, especially so if the oxidizer incorporated in the resin is thermally unstable or is too sensitive to shocks. For the above reason it is desirable to avoid the introduction of this hazard in the manufacturing operation if possible.

In accordance with our invention, we provide a novel kind of propellant charge which avoids the disadvantages involved in the foregoing prior known kinds of propellants.

Our novel propellant can be made to give a substantially smokeless exhaust upon combustion which is free of poisonous or harmful gases; and it furthermore has the properties required of propellants of this character of maintaining its physical properties and qualities over a wide range of temperatures, so that it will be usable without danger even though carried through changes of temperature before using. In particular, it will maintain its desired smooth and uniform burning surface without cracking during these temperature changes.

Furthermore, our novel propellant has the important advantage that it can be set or cured at ambient temperatures, thereby avoiding the hazards in high temperature curing of such materials.

Our novel solid propellant charge is a mixture comprising a highly oxidized oxygen donor, a combustible binder carrying the oxygen donor, and a plasticizer for the binder, the plasticizer serving also as a desensitizer or phlegmatizer for the oxygen donor, to render the mixture relatively safe from undesired detonation and explosion. The desensitizing plasticizer should contain some oxygen which helps to supply a portion of the oxygen required for the combustion of the propellant; as carrying its own oxygen renders it unnecessary to add other additional oxygen sufficient to burn the plasticizer. It has been found that 2,2-dinitropropane is such a desensitizing plasticizer.

The highly oxidized oxygen donor should preferably be an organic compound containing relatively large numbers of nitro groups ($NO_2$); and it should be compatible with the resin and allow it to polymerize when mixed therein. Organic substances found especially suitable are pentaerythritol tetranitrate, hereafter referred to as PETN, cyclotrimethylenetrinitramine, hereafter referred to as cyclonite (RDX), and tetranitrobutane as these have been found to result in a propellant producing a substantially smokeless exhaust, while furnishing sufficient oxygen and allowing the resulting propellant to have the desired physical properties and desirable temperature characteristics over a wide range. It is intended to include in the term tetranitrobutane all the various tetranitrobutanes such as, for example, 1,1,4,4-tetranitrobutane, 2,2,3,3-tetranitrobutane, etc.

Other oxidizers compatible with the resin mixture could be used either alone or in mixtures with each other or with the above organic oxidizers; and these include inorganic oxidizers such as chromates, permanganates, nitrates, perchlorates, and peroxides. All of these inorganic oxidizers are not entirely smokeless, particularly those that have metallic anions; and the amount of smoke produced will depend in large measure on the amount of inorganic oxidizer used. When the inorganic oxidizers are used, the preferred ones are the nitrates, especially the non-metallic nitrates such as ammonium nitrate, since upon decomposition it does not give off any smoke or noxious gases. In case a semismokeless charge is to be made using an inorganic oxidizer, ammonium perchlorate will generally be preferred, since it is a good oxidizer, and on decomposition it gives off only HCl gas which when coming in contact with moisture produces a fog which is not as smoky as, for example, is the smoke produced when potassium perchlorate is used as the oxidizer, although the latter is otherwise a good oxidizer. As a general rule it will be desirable to employ oxidizers that are solid and can be comminuted into particles of very minute size.

We have found that the binder which is used must have particular characteristics for the production of a propellant having the desired physical properties. We have found that a suitable binder is a thermosetting resin type of condensation product. The preferred form of condensation product, which we have discovered has the characteristic of polymerizing successfully in the presence of organic nitro compounds or organic nitrates, is a furane derivative type of condensation product obtained by condensing furfuryl alcohol in the presence of a catalyst. The condensation is preferably carried out until all of the water and other products that will split off during the condensation have been formed and removed. The catalyst is then neutralized and removed from the resinous condensation product. The resin which is formed by this condensation is generally in the form of a viscous liquid in which form it is usually shipped. There is some doubt as to the exact empirical formula of furane resin because of the complexity of the reactions involved, since a partial polymerization can take place in conjunction with the condensation. The molecular weight of the average condensation product is between 1000 and 1500 and the empirical formula has been generally accepted to be $C_8H_{10}O_3$. The resin supplied by the manufacturer is through the condensation reaction stage and all of the by-products, such as water, etc., have been removed. The polymerization of this condensation product which takes place upon the addition of a suitable catalyst is a true polymerization and no change in the molecular proportions of the various ingredients will be encountered. Polymerization occurs through straight cross linking which takes place at the two active furane double bonds. The propellant ingredients such as the oxygen donor and the fluidizer-desensitizer are then incorporated in the various liquid condensation product of furfuryl alcohol and true polymerization of the resin takes place when a strongly acidic catalyst such as hydrochloric acid, nitric acid, etc., is employed.

As stated above, this form of condensation product is capable of polymerization in the presence of the oxygen donor and desensitizing agent and a fluidizer present in the uncured propellant. Such a furfuryl alcohol condensation resin is obtained under the trade name of "Duralon" and is manufactured by the United States Stoneware Corporation.

The resin may be so highly viscous as to make desirable or necessary, the use of the fluidizer-desensitizer, mentioned above, to lower its viscosity in order that the oxidizer which is added to the fluid plastic can be uniformly distributed throughout the mass. Such fluidizing agent should, of course, not impair the ready polymerization of the resin. We have found that 2,2-dinitropropane is a material which meets these requirements and it has the desirable phelgmatizing or desensitizing qualities for the oxidizer.

Some oxidizers, particularly some of the organic oxidizers, are very sensitive in their pure state; and the organic oxidizers PETN, cyclonite and tetranitrobutane are so sensitive that they are generally employed as boosters only in setting off explosive charges. We have rendered them sufficiently stable for use in propellants, however, by using the desensitizer, 2,2-dinitropropane.

Heretofore it has been customary to desensitize substances such as PETN with a wax-like compound having a general formula of $(CH_2)_n$ which is melted and a coating applied to the organic compound. A disadvantage of using this class of desensitizer when compounding propellant grains, however, lies in the fact that the waxy materials generally contain no oxygen to support their own combustion either in whole or in part and, therefore, it becomes necessary to supply additional oxidizing agent to compensate for the lack of oxygen in this component of the propellant mass.

Since the principal purpose of the desensitizer is to make the organic oxidizer stable, the addition of more of the unstable oxidizer to insure the combustion of the desensitizer usually results in a mixture that has enough of the unstable organic oxidizer to be sensitive to shock and jars.

Another disadvantage of using such prior known desensitizers to render the oxygen donor stable is that the materials such as the waxes would if used in sufficient quantity effectively decrease the specific impulse of the propellant grain, and furthermore the addition of substantial amounts of these desensitizers affects unfavorably the physical properties of the finished propellant charge.

We have discovered that 2,2-dinitropropane serving as a desensitizer for PETN or cyclonite may replace the prior known wax-like type of desensitizer entirely. While 2,2-dinitropropane resembles a wax and has wax-like properties it is ideally suited because it carries sufficient oxygen in its own molecule to insure a sufficient degree of self oxidation.

Another advantage of using 2,2-dinitropropane as a fluidizing-desensitizing compound is that it does not affect the polymerization of resins such as the furane condensation product type of plastics.

The oxygen donor and the fluidizer-desensitizer may be intimately mixed into the resin, and the mixture then cast into the desired form of the solid propellant charge. In the casting the mixture can be poured while in a fluid state, and it can then be polymerized to set it in the desired solid form.

A propellant mass containing PETN, 2,2-dinitropropane and bound together with a polymerized furane derivative, forms a propellant mass having desirable physical properties and when burned, it gives off an exhaust which does not contain smoke-forming components, or corrosive or fog-producing gases. The entire propellant mass may be mixed and polymerized by catalysts at ambient temperatures, thereby eliminating the hazards attending thermal curing.

Activators which will stimulate the polymerization of furane type resins at ordinary ambient temperatures are solutions of fairly strong ionic substances such as acids, alkalis and acid salts. Examples of the acids are hydrochloric, sulfuric, nitric, phosphoric, etc. Examples of the alkalis are sodium hydroxide, potassium hydroxide and other hydroxides having sufficiently high pH in water solution. Examples of the acid salts are aluminum sulfate, aluminum chloride, etc. The preferred catalysts for stimulating the polymerization of furane resins are the acids such as hydrochloric, sulfuric, nitric and phosphoric.

The preferred method of compounding the propellant is as follows: Dinitropropane is added to the furane-derivative resin and is dissolved in the resin reducing its viscosity so that the solid oxidizer material, such as the organic oxidizer, may be incorporated homogeneously therein. The oxidizer comprises the finely ground substance such as PETN or cyclonite. Another suitable oxidizer is tetranitrobutane. The oxidizer is then intimately dispersed in the unpolymerized furane resin containing the dinitropropane and the entire mixture is stirred continuously until it has become homogeneous. A catalyst, preferably one of the acid catalysts listed above, is added thereto causing the resin to polymerize. This binds the oxidizer, fluidizer-desensitizer and resin into a hard, dense, compact mass. The unpolymerized mixture may be cast into any desired shape of container before the catalyst is added. The preferred form usually will be a cylindrical vessel since propellant is generally employed in the form of cylindrical grains or sticks. The polymerized mass may then be used as an unrestricted burning grain, that is, a grain in which combustion simultaneously occurs on more than one surface at the same time, or the propellant grain may be lined and wrapped to form a restricted burning charge, that is, one in which combustion can occur on one surface alone, having a predetermined area which remains substantially uniform throughout the entire burning period.

The propellant may be compounded by employing from about 50% to about 70% by weight of the oxygen donor based on the weight of the total propellant mass;

from about 15% to 30% of binder based on the total weight of the propellant mass and from about 15% to about 30% by weight of the fluidizing-desensitizing agent based on the weight of the total propellant mass.

An example of such a propellant is one having about 60% by weight PETN desensitized by about 20% by weight of 2,2-dinitropropane and bound together by about 20% by weight of polymerized furane derivative resin such as "Duralon".

Another example of a propellant according to our invention is a mixture containing 25.5% by weight of polymerized furane-derivative resin, 53% by weight of cyclonite, 19.6% of 2,2-dinitropropane and 1.09% of an acid activator to help set the resin.

Another example of a propellant according to our invention is a mixture containing about 20.7% by weight of polymerized furane-derivative resin, 16.0% of 2,2-dinitropropane, 1.6% by weight of activator to help polymerize the resin and 61.7% by weight of cyclonite.

Another example is 17.3% by weight of polymerized furane-derivative resin, 18% by weight of 2,2-dinitropropane, 9.7% by weight of an activator to help polymerize the resin, and 64% by weight of ammonium nitrate.

A semi-smokeless composition may be compounded using the resin and fluidizer-desensitizer as follows: 17.05% by weight of polymerized furane-derivative resin, 18.2% by weight of 2,2-dinitropropane, .07% by weight of activator for producing polymerization of the resin, and 63.6% by weight of ammonium perchlorate.

It should be understood that the oxygen donor in the propellant mixtures can be composed of one or more of the several substances indicated herein as being useful. For example, the oxygen donor may be a mixture of PETN and cyclonite; or a mixture of either or both PETN and cyclonite together with one or more of the other indicated oxygen donors. In any case, the total amount of all the oxygen donor substance in the mixture will be substantially as indicated above, that is, within the range of about 50% to 70% by weight of the mixture.

An advantage to be derived by employing the propellant compounded to the teachings of our present invention is that it is possible to blend and cure the mixture entirely at ambient temperature thereby avoiding the hazardous operation of thermal curing.

Another advantage which is of particular importance especially in military operation is that the propellant charges are substantially smokeless on combustion and the exhaust gases from the combustion of the charges are free of any poisonous fumes.

Another advantage is that it is possible to incorporate organic oxidizer into the propellants that are normally too sensitive to warrant their use in this type of charge. The charges are, furthermore, little affected by changes in temperature and may be employed over a wide range of conditions varying from the extreme cold of the artic region to the heat encountered in the tropical regions.

We claim:

1. A propellant comprising an intimate mixture of about 15 to 30% by weight of the mixture of polymerized furfuryl alcohol condensation resin, and about 15 to 30% by weight of the mixture of 2,2-dinitropropane, and about 50 to 70% by weight of the mixture of an oxygen donor which is compatible with the resin.

2. A propellant comprising an intimate mixture of about 15 to 30% by weight of the mixture of polymerized furfuryl alcohol condensation resin, and about 15 to 30% by weight of the mixture of 2,2-dinitropropane, and about 50 to 70% by weight of the mixture of one or more organic oxygen donor substances from the group consisting of pentaerythritol-tetranitrate, cyclotrimethylene trinitramine, and tetranitrobutane.

3. A propellant comprising an intimate mixture of about 50 to 70% by weight of the mixture of pentaerythritol-tetranitrate, about 15 to 30% by weight of the mixture of polymerized furfuryl alcohol condensation resin, and about 15 to 30% by weight of the mixture of 2,2-dinitropropane.

4. A propellant comprising an intimate mixture of about 50 to 70% by weight of the mixture of cyclotrimethylene trinitramine, about 15 to 30% by weight of the mixture of polymerized furfuryl alcohol condensation resin and about 15 to 30% by weight of the mixture of 2,2-dinitropropane.

5. A propellant comprising an intimate mixture of about 50 to 70% by weight of the mixture of oxygen donor substance from the group consisting of pentaerythritol-tetranitrate, cyclotrimethylene trinitramine, tetranitrobutane and the inorganic chromates, perchlorates, nitrates, permanganates and peroxides, and mixtures thereof, about 15 to 30% by weight of said intimate mixture of polymerized furfuryl alcohol condensation resin, and about 15 to 30% by weight of the mixture of 2,2-dinitropropane.

6. A propellant according to claim 5 in which there is added a small amount, up to about 10% by weight of the mixture of an activator to help polymerize the resin.

7. A propellant consisting of about 60% by weight of the propellant of pentaerythritol-tetranitrate desensitized with about 20% by weight of the propellant of 2,2-dinitropropane, and bound together by a binder of about 20% by weight of the propellant of polymerized furfuryl alcohol condensation resin.

8. A propellant consisting of about 53% by weight of the propellant of cyclonite desensitized with about 19.6% by weight of the propellant of 2,2-dinitropropane and bound together by a binder of about 25.5% by weight of the propellant of polymerized furfuryl alcohol condensation resin, the mixture containing about 1.09% of an acid activator to help set the resin.

9. A propellant consisting of about 61.7% by weight of the propellant of cyclonite desensitized with about 16% by weight of the propellant of 2,2-dinitropropane, and bound together by a binder of about 20.7% by weight of polymerized furfuryl alcohol condensation resin, the mixture containing about 1.6% by weight of an activator to help polymerize the resin.

10. A propellant consisting of about 64% by weight of the propellant of ammonium nitrate, about 18% by weight of the propellant of 2,2-dinitropropane, about 17.3% of polymerized furfuryl alcohol condensation resin and about 9.7% by weight of an activator to help polymerize the resin.

11. The method of compounding a solid propellant which comprises mixing 2,2-dinitropropane in an oxygen donor material selected from the group consisting of pentaerythritol-tetranitrate, cyclonite, tetranitrobutane and inorganic oxidizers, stirring said mixture and intimately dispersing the mixture in unpolymerized furfuryl alcohol condensation resin and polymerizing the resin by aid of an acid catalyst selected from the group consisting of hydrochloric, sulfuric, nitric and phosphoric acids.

12. The method of compounding a solid propellant which comprises mixing 2,2-dinitropropane in unpolymerized furfuryl alcohol condensation resin, dissolving an oxygen donor substance in the 2,2-dinitropropane and resin mixture, and adding a catalyst to induce polymerization of the unpolymerized resin.

References Cited in the file of this patent

UNITED STATES PATENTS

| 1,700,085 | Scott | Jan. 22, 1929 |
| 2,445,137 | Farber | July 13, 1948 |

FOREIGN PATENTS

| 574,271 | Great Britain | Dec. 31, 1945 |
| 579,058 | Great Britain | July 22, 1946 |